(12) United States Patent
Hess

(10) Patent No.: US 9,781,528 B2
(45) Date of Patent: Oct. 3, 2017

(54) SYSTEM FOR OBJECTIVE QUALIFICATION OF LISTENER ENVELOPMENT OF A LOUDSPEAKER-ROOM ENVIRONMENT

(75) Inventor: Wolfgang Hess, Karlsbad (DE)

(73) Assignee: Harman Becker Automotive Systems GmbH, Karlsbad (DE)

( * ) Notice: Subject to any disclaimer, the term of this patent is extended or adjusted under 35 U.S.C. 154(b) by 213 days.

(21) Appl. No.: 13/590,749

(22) Filed: Aug. 21, 2012

(65) Prior Publication Data

US 2012/0314873 A1 Dec. 13, 2012
US 2016/0381478 A9 Dec. 29, 2016

Related U.S. Application Data

(62) Division of application No. 12/032,386, filed on Feb. 15, 2008, now Pat. No. 8,270,619.

(30) Foreign Application Priority Data

Feb. 21, 2007 (EP) ..................................... 07003586

(51) Int. Cl.
*H04R 29/00* (2006.01)
*G01H 3/00* (2006.01)
*H04S 7/00* (2006.01)

(52) U.S. Cl.
CPC ............. *H04R 29/001* (2013.01); *G01H 3/00* (2013.01); *H04S 7/30* (2013.01); *H04S 7/40* (2013.01); *H04S 2420/01* (2013.01)

(58) Field of Classification Search
CPC .......... H04S 7/30; H04S 2420/01; H04S 7/40; H04R 29/00; G01H 3/00; G01H 3/14

USPC ..... 381/1, 17, 19, 309, 310, 26, 74, 56, 339
See application file for complete search history.

(56) References Cited

U.S. PATENT DOCUMENTS

| 5,638,343 | A | 6/1997 | Ticknor |
| 6,118,875 | A * | 9/2000 | Møller et al. ..................... 381/1 |
| 7,092,541 | B1 * | 8/2006 | Eberbach ..................... 381/300 |
| 2004/0086131 | A1 * | 5/2004 | Ringlstetter et al. ........... 381/59 |
| 2004/0136538 | A1 | 7/2004 | Cohen et al. |
| 2005/0078833 | A1 * | 4/2005 | Hess et al. ..................... 381/26 |

FOREIGN PATENT DOCUMENTS

EP 1 522 868 A1 4/2005

OTHER PUBLICATIONS

Hess, "Evaluation of Auditory Spatial Impression in Performance Spaces", Forum Acusticum 2005 Budapest, pp. 1735-1740.*
Hess, W., Time-Variant Binaural-Activity Characteristics as Indicator of Auditory Spatial Attributes, XP007918525, pp. 1-80, Karlsbad 2006.

(Continued)

*Primary Examiner* — Vivian Chin
*Assistant Examiner* — Con P Tran
(74) *Attorney, Agent, or Firm* — Brooks Kushman P.C.

(57) ABSTRACT

A system quantifies listener envelopment in a loudspeakers-room environment. The system includes a binaural detector that receives frequency modulated audible noise signals from multiple loudspeakers. The binaural detector generates detected signals that are analyzed to determine an objective listener envelopment. The envelopment is based on binaural activity of one or more sub-bands of the detected signal.

13 Claims, 9 Drawing Sheets

(56) References Cited

OTHER PUBLICATIONS

Hess, Wolfgang et al., "Evaluation of auditory spatial impression in performance spaces," Forum Acusticum 2005 Budapest, pp. 1735-1740, XP007902554.
Hess, Wolfgang et al., "Acoustical evaluation of virtual rooms by means of binaural activity patterns," Audio Engineering Society, Convention Paper 5864, Presented at the $115^{th}$ Convention, Oct. 10-13, 2003, New York, New York, pp. 1-8, XP007902553.
Lindemann, W., "Extension of a binaural cross-correlation model by contralateral inhibition. I. Simulation of lateralization for stationary signals," *J. Acoust. Soc. Am.*, vol. 80, No. 6, Dec. 1986, pp. 1608-1622, XP007902557.
Grantham, D. Wesley et al., "Detectability of varying interaural temporal differences$^{a)}$," *J. Acoust. Soc. Am.*, vol. 63, No. 2, Feb. 1978, pp. 511-523, XP007902556.
Grabke, J. and Blauert, J., Cocktail Party Processors Based on Binaural Models, XP007918561, pp. 243-255.
Blauert, "Instrumental Analysis and Synthesis of Auditory Scenes: Communication Acoustics", AES 22nd International Conference on Virtual Synthesis, Entertainment and Audio, Jun. 15, 2002, pp. 1-9.

\* cited by examiner

SYSTEM FOR OBJECTIVE QUALIFICATION OF LISTENER ENVELOPMENT OF A LOUDSPEAKER-ROOM ENVIRONMENT

PRIORITY CLAIM

This application is a Divisional application claiming priority to U.S. patent application Ser. No.12/032,386, filed on Feb. 15, 2008, now U.S. Pat. No. 8,270,619, which claims priority to EP07003586.0, filed Feb. 21, 2007, each of which is incorporated herein by reference.

BACKGROUND OF THE INVENTION

1. Technical Field

The present invention relates to loudspeakers-room environments and, more particularly, a system for objective quantification of listener envelopment of a loudspeakers-room environment.

2. Related Art

The acoustic quality of audio entertainment and audio information systems may depend on the acoustic characteristics of the listening rooms. Such rooms differ in their dimensions and shapes, (e.g., in the range from concert halls to vehicle compartments).

As a sound travels away from its source, a certain proportion of it reaches the listener as direct sound following a straight path. A certain proportion of the sound radiates in all directions from the source and encounters the boundaries of an enclosure. The direct sound and reflections may cause auditory spatial perception. The reflected sound may be delayed and frequency colored. The delay, frequency coloration and reverberation may be captured and interpreted cognitively to give an auditory perception of the sound system and the space in which the sound travels.

Sound reflections may include lateral reflections that are perceived within 1 to 80 ms after the direct sound is received. Late reflections may be perceived more than 80 ms after arrival of a direct sound. The relationship of early lateral reflections with direct sound may provide a person with a sense of the direction and location of the sound source. An auditory source in a room may be perceived as a finite lateral extent. The temporal and spatial separation of sound energy of the late reflection may cause a listener to feel completely enclosed by the sound. This phenomenon is known as the listener envelopment (LEV). The LEV represents the degree of envelopment or fullness of auditory events surrounding the listener.

Derivation and measurement of objective quantifications of the spatial auditory characteristics of a closed listening room are difficult to achieve. Monaural parameters do not often correlate well with perceptible characteristics. Measurement results of binaural parameters may depend on the actual measurement position and are difficult to implement. A ranking of the listener rooms, e.g., concert halls, based on established parameters may not sufficiently match the auditory perception and preferences of human listeners. Therefore, it is difficult to adjust sound-systems including loudspeakers in closed rooms to provide optimum audio quality.

SUMMARY

A system quantifies listener envelopment in a loudspeakers-room environment. The system includes a binaural detector that receives frequency modulated audible noise signals from multiple loudspeakers. The binaural detector generates detected signals that are analyzed to determine an objective listener envelopment. The objective listener envelopment is based on binaural activity of one or more sub-bands of the detected signal.

Other systems, methods, features, and advantages of the invention will be, or will become, apparent to one with skill in the art upon examination of the following figures and detailed description. It is intended that all such additional systems, methods, features and advantages be included within this description, be within the scope of the invention, and be protected by the following claims.

BRIEF DESCRIPTION OF THE DRAWINGS

The invention can be better understood with reference to the following drawings and description. The components in the figures are not necessarily to scale, emphasis instead being placed upon illustrating the principles of the invention. Moreover, in the figures, like referenced numerals designate corresponding parts throughout the different views.

DETAILED DESCRIPTION OF THE PREFERRED EMBODIMENTS

Figure 1:
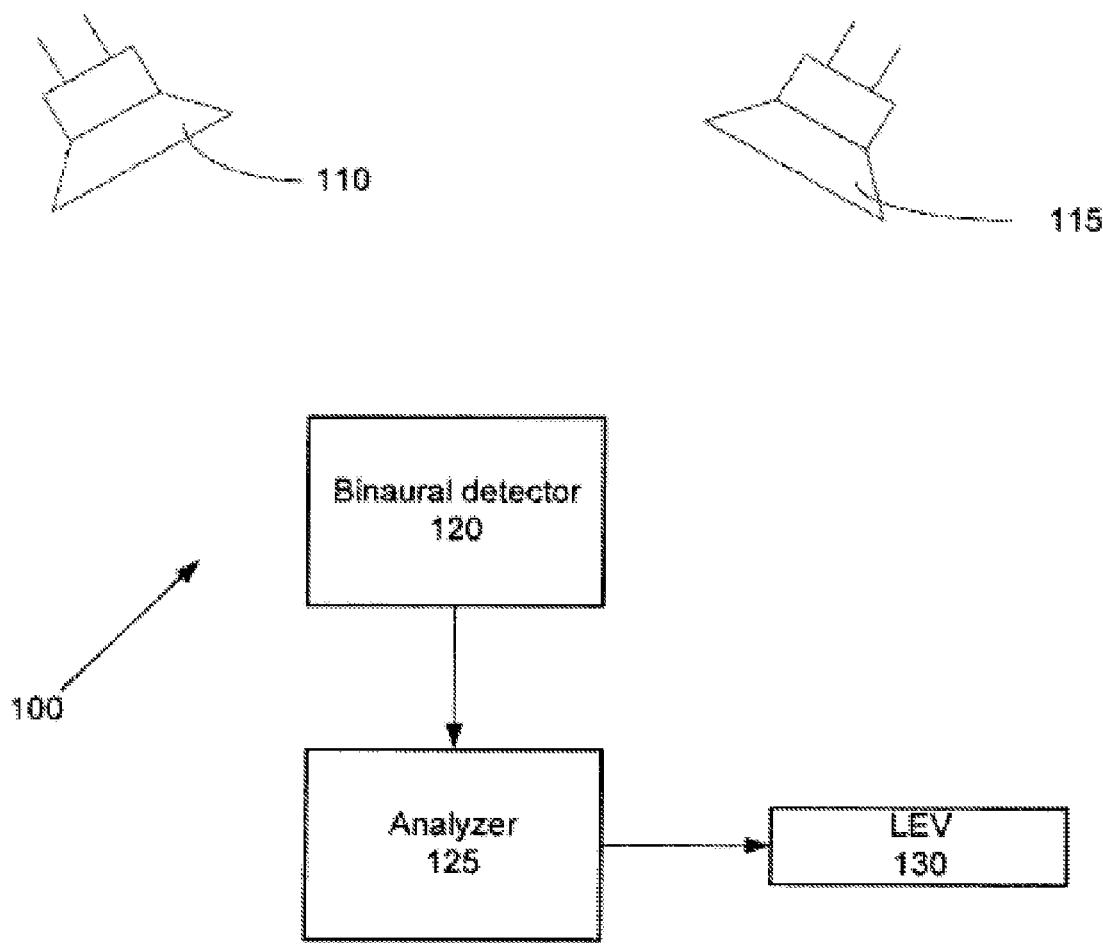
FIG. 1 is system that may be used to determine listener envelopment of a loudspeakers-room environment.

FIG. 1 is a system 100 that may determine listener envelopment of a loudspeakers-room environment. The system 100 includes a first loudspeaker 110 that provides an audible first frequency modulated noise signal and a second loudspeaker 115 that provides an audible second frequency modulated noise signal. The noise signals may be stereo signals respectively generated by combining two narrow band signals that are limited to one auditory band and exhibit some degree of phase coincidence from band to band to one signal. The degree of listener envelopment may depend on phase-coincidence and distance of auditory bands. The larger the phase-coincidence, the less listener envelopment is perceived. The higher the band distance, the less listener envelopment is perceived. Signals in two directly adjacent bands with opposite phases in binaural activity have the highest amount of perceived listener envelopment.

The audible first and second frequency modulated noise signals may be in the form of broadband noise having sinusoidally varying interaural time differences and may correspond to left and right stereo channels of the form:

$$l(t) = \sum_{i=1}^{N} A\sin\left(\frac{2\pi f_i t}{F_s} + \theta_i + \pi f_i \Delta t \sin\left(\frac{2\pi F_M t}{F_s}\right)\right)$$

$$r(t) = \sum_{i=1}^{N} A\sin\left(\frac{2\pi f_i t}{F_s} + \theta_i - \pi f_i \Delta t \sin\left(\frac{2\pi F_M t}{F_s}\right)\right),$$

respectively, where A corresponds to an amplitude, $f_i$ corresponds to carrier frequencies, $F_M$ corresponds to a modulation frequency, $F_s$ corresponds to a sampling rate, respectively, $\Delta t$ corresponds to a maximum interaural time difference, and $\theta_i$ corresponds to arbitrary phases, and t corresponds to a discrete time index. Alternatively, the left and right stereo channels may have the form:

$$l(t) = \sum_{i=1}^{N} A\sin\left(\frac{2\pi f_i t}{F_s} + \theta_i + \pi \Delta t \sin\left(\frac{2\pi F_M t}{F_s}\right)\right)$$

$$r(t) = \sum_{i=1}^{N} A\sin\left(\frac{2\pi f_i t}{F_s} + \theta_i - \pi \Delta t \sin\left(\frac{2\pi F_M t}{F_s}\right)\right).$$

respectively, where A corresponds to an amplitude, $f_i$ corresponds to carrier frequencies, $F_M$ corresponds to a modulation frequency, $F_s$ corresponds to a sampling rate, respectively, $\Delta t$ corresponds to a maximum interaural time difference, and $\theta_i$ corresponds to arbitrary phases, and t corresponds to a discrete time index.

In each instance, the interaural time difference caused by the time interval $\Delta t$ is included in the generated noise signals independent of the actual loudspeakers-room transfer function and the actual position of signal measurement. As a result, an objective measurement of the listener envelopment may be obtained.

Thus, two frequency-modulated broadband noise signals are generated with a predetermined maximum interaural time difference that changes periodically as a function of time. The distance of the carrier frequencies of the two signals may be chosen as a tenth part of 1 Hz, e.g., 0.1 Hz. Modulation frequencies may range from greater than zero Hz to several thousand Hz. The maximum interaural time difference may be chosen from $\Delta t=10$ to 1000 µs, such as about, 60, 90, 120, 150, 180 µs. The phases are randomly chosen for every signal from 0 to about $2\pi$ and may be initially coincident with one another. The sampling rate may be 48 kHz. Noises may be generated with center frequencies of 490 Hz, 630 Hz, 800 Hz, 100 Hz and/or 1250 Hz. Phase shifted narrowband signals may be combined to obtain single signals output by each loudspeaker.

System 100 also includes a binaural detector 120 that is adapted to transduce the audible first and second frequency modulated noise signals received from the loudspeakers 110 and 115 to generate detected signals. The loudspeakers 110 and 115 and binaural detector 120 may be disposed in a common loudspeakers-room environment. The binaural detector 120 detects both noise signals. If a sound source is closer to one ear of a listener than to the other ear, the sounds generated by the sound source will arrive at slightly different times at the respective ears. This difference in arrival times is termed interaural time difference. Experiments have shown that the interaural time difference as well as the interaural level difference (caused by some shading due to the head position), and the sound spectrum are the main clues for auditory localization in three dimensions. The human auditory system processes the respective qualities for auditory spatial perception. Interaural time differences and interaural level differences are present in the detected signals provided by the binaural detector 120 similar to the perception of a human listener.

The amount of listener envelopment may depend on the phase shift between the interaural time difference noise signals and the frequency distance of the narrowband noise signals. If two narrow-band signals not within the same frequency band are combined, a continuous increase of the perceived listener envelopment with increasing phase shift occurs.

When incoming interaural time difference noise signals are output by loudspeakers in a loudspeakers-room environment, the surrounding surfaces will reflect, scatter and bundle sound signals and mix phase relations. By this affect, the listener envelopment is altered by the room. The phase information of the detected signals may be determined and used to provide an indication of the listener envelopment of the loudspeakers-room environment.

The detected signals are provided to an analyzer 125. The analyzer 125 is adapted to determine objective listener envelopment of the loudspeakers-room environment based on binaural activity of at least two sub-bands of the detected signals. The binaural activity represents a three-dimensional output obtained by processing of the detected signals. The binaural activity obtained by processing audio signals close to the processing of the human auditory system may be seen as a measure for binaural neural activity.

Determination of the objective listener envelopment by the analyzer 125 may include execution of a correlation analysis of the phase relationship of binaural activities in the two sub-bands. Alternatively, or in addition, the analyzer 125 may determine the binaural activity over time and the lateral deviation of the sub-bands by combining the interaural time differences and the interaural level differences of the sub-bands. Superposing periodic parts of the binaural activities of different auditory frequency bands and executing a pattern recognition using correlation analysis allows reconstruction of sinusoidal fluctuations in those sub-bands. A measure for the amount of listener envelopment may be obtained by combining the temporal shift of the signal functions and the auditory band distance.

The analyzer 125 may have additional functionality. The binaural activity may be smoothed by the analyzer in time using a floating rectangle or integration window. The floating rectangular integration window may have a duration of about 10-200 milliseconds. The temporal smoothing may be used to model the auditory processing of the human auditory system. The analyzer may also operate to weight objective listener envelopment values using a frequency-band weighting curve to obtain a single objective listener envelopment value 130. The frequency-band weighting curve may correspond to an equal loudness curve such as an ISO 226 or 468-weighting curve.

Figure 2:
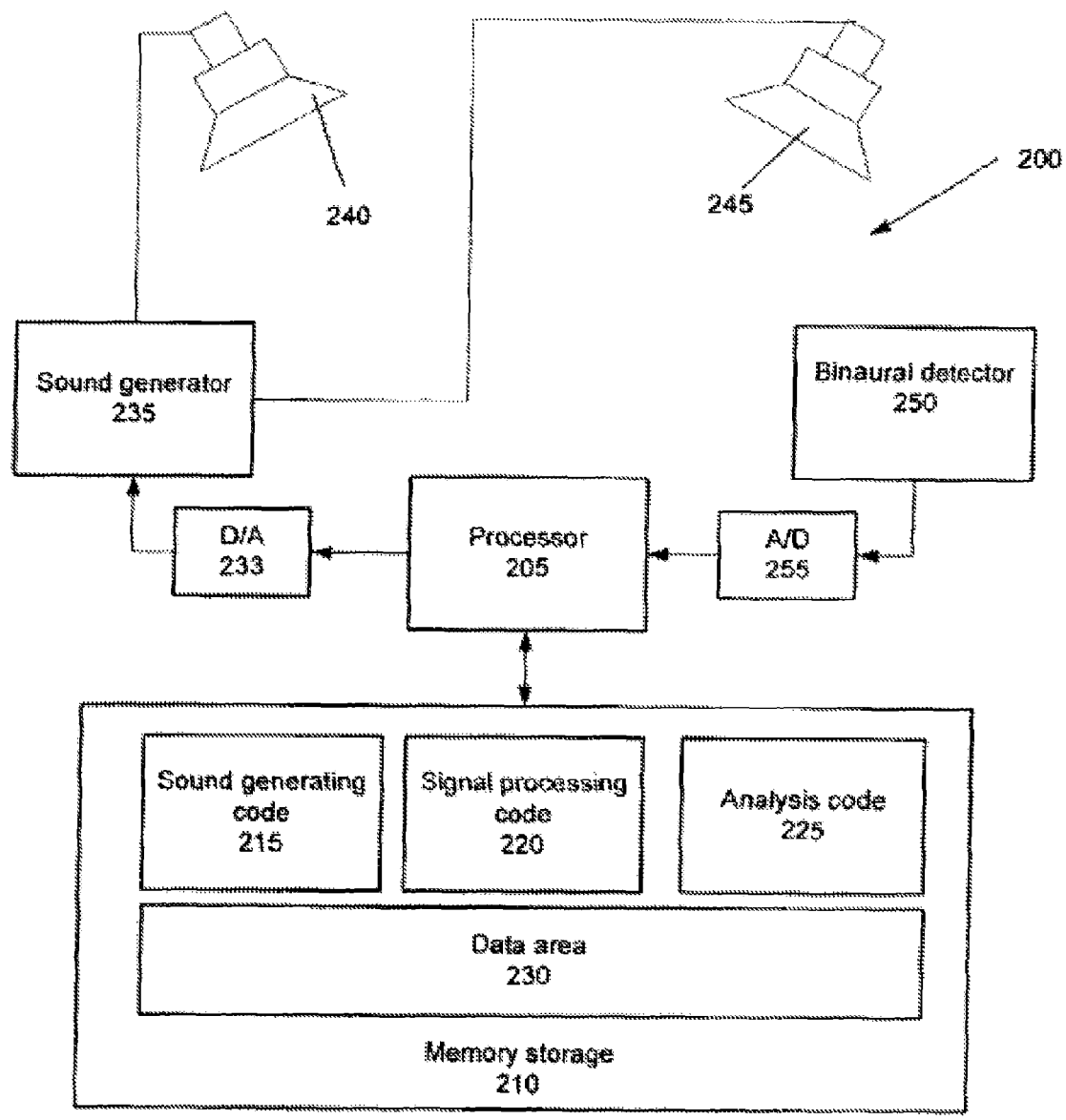
FIG. 2 is a second system that may be used to determine listener envelopment of a loudspeakers-room environment.

FIG. 2 is a second system 200 that may be used to determine the listener envelopment of a loudspeakers-room environment. System 200 includes a processor 205 that may access memory storage 210. Memory storage 210 may include software code that is executable by the processor 205. The executable code may include sound generating code 215, signal processing code 220, and analysis code 225. Memory storage 210 may also include a data area 230 that is accessible to the processor 205 to store and retrieve data used in executing the software code.

The processor 205 executes the sound generating code 215 to generate first and second frequency modulated electronic noise signals. Digital values corresponding to the first and second frequency modulated noise signals are provided to a digital-to-analog converter 233. The output of the digital-to-analog converter 233 may be provided to a sound generator 235 that supplies the electronic first and second frequency modulated noise signals to a first loudspeaker 240 and a second loudspeaker, respectively. The electronic first and second frequency modulated noise signals may be in the form of broadband noise having sinusoidally varying interaural time differences and may correspond to left and right stereo channels of the form:

$$l(t) = \sum_{i=1}^{N} A\sin\left(\frac{2\pi f_i t}{F_s} + \theta_i + \pi f_i \Delta t \sin\left(\frac{2\pi F_M t}{F_s}\right)\right)$$

$$r(t) = \sum_{i=1}^{N} A\sin\left(\frac{2\pi f_i t}{F_s} + \theta_i - \pi f_i \Delta t \sin\left(\frac{2\pi F_M t}{F_s}\right)\right),$$

respectively, where A corresponds to an amplitude, $f_i$ corresponds to carrier frequencies, $F_M$ corresponds to a modulation frequency, $F_s$ corresponds to a sampling rate, respectively, $\Delta t$ corresponds to a maximum interaural time difference, and $\theta_i$ corresponds to arbitrary phases, and t corresponds to a discrete time index. Alternatively, the left and right stereo channels may have the form:

$$l(t) = \sum_{i=1}^{N} A\sin\left(\frac{2\pi f_i t}{F_s} + \theta_i + \pi \Delta t \sin\left(\frac{2\pi F_M t}{F_s}\right)\right)$$

$$r(t) = \sum_{i=1}^{N} A\sin\left(\frac{2\pi f_i t}{F_s} + \theta_i - \pi \Delta t \sin\left(\frac{2\pi F_M t}{F_s}\right)\right).$$

respectively, where A corresponds to an amplitude, $f_i$ corresponds to carrier frequencies, $F_M$ corresponds to a modulation frequency, $F_s$ corresponds to a sampling rate, respectively, $\Delta t$ corresponds to a maximum interaural time difference, and $\theta_i$ corresponds to arbitrary phases, and t corresponds to a discrete time index.

The loudspeakers 240 and 245 transduce the first and second electrical frequency modulated noise signals to audible signals. Loudspeaker 240 may be used to transduce the first electrical frequency modulated noise signal to a first audible frequency modulated noise signal. Loudspeaker 245 may be used to transduce the second electrical frequency modulated noise signal to a second audible frequency modulated noise signal.

The audible signals from the loudspeakers 240 and 245 are detected by a binaural detector 250 disposed in a loudspeakers-room environment with the loudspeakers. The binaural detector 250 transduces the audible signals to electrical signals that may be converted to digital signals by an analog-to-digital converter 255.

The converted digital signals may be stored in data area 230 for processing using the signal processing code 220. The detected signals may be filtered to obtain sub-band signals for at least two sub-bands of the detected signals. This filtering may be part of the signal processing code 220, separate filtering code, and/or the binaural detector 250. The filtering may simulate physiological properties of a human ear.

The signal processing code 220, executable by the processor 205, may determine binaural activity in at least two sub-bands of the detected signals and may determine binaural activity in some or all sub-bands of the filtered detected signals. It may be used to determine the interaural time differences and the interaural level differences of the sub-bands of the detected signals. The interaural time differences and the interaural level differences may be combined through execution of the signal processing code 220 to obtain the binaural activity over time and lateral deviation for each of the sub-bands.

Digital values corresponding to the binaural activity in each of the sub-bands of the detected signals may be stored in data area 230 for use by the processor 205 in execution of the analysis code 225. The analysis code 225 is executed by the processor 205 to determine objective listener envelopment of the loudspeakers-room environment based on the binaural activity of at least two sub-bands of the detected signal. Alternatively, all detected sub-bands may be used to determine the objective listener envelopment. The objective listener envelopment may be determined by executing a correlation analysis of the phase relationship of binaural activities in adjacent to sub-bands.

The analysis code 225 may also provide further functionality. Execution of the analysis code 225 may be used to smooth the binaural activity in time using a floating rectangular integration window. The integration window may have a duration of about 10-200 milliseconds. The analysis code 225 also may be executed to weight objective listener envelopment values using a frequency-band weighting curve to obtain a single objective listener envelopment value.

Figure 3:
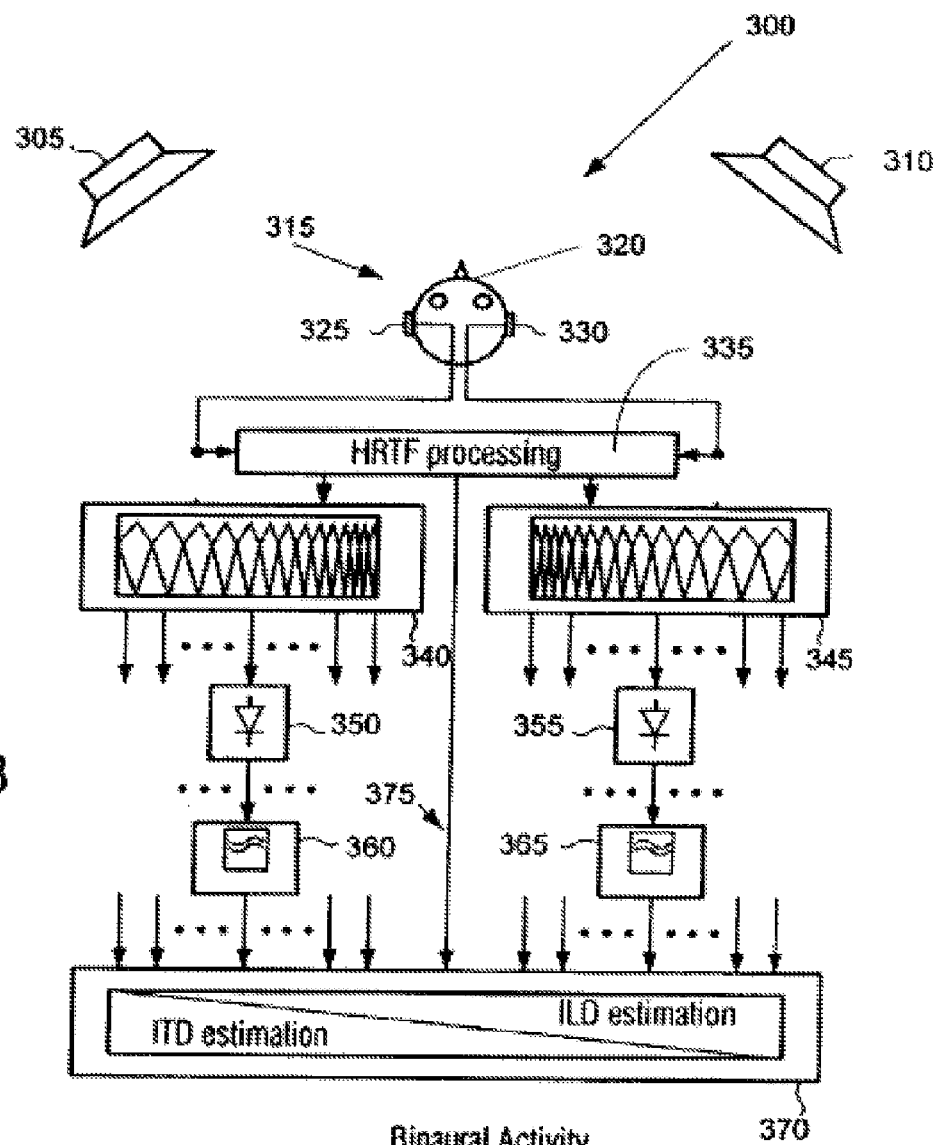
FIG. 3 is a third system that may be used to determine listener envelopment of a loudspeakers-room environment.

FIG. 3 is a third system 300 that may be used to determine listener envelopment of a loudspeakers-room environment. The system 300 includes first and second loudspeakers 305 and 310 that provide first and second audible frequency modulated noise signals, respectively. The audible noise signals are supplied to a loudspeakers-room environment and may be in the form of broadband noise having sinusoidally varying interaural time differences that correspond to left and right stereo channels where:

$$l(t) = \sum_{i=1}^{N} A\sin\left(\frac{2\pi f_i t}{F_s} + \theta_i + \pi f_i \Delta t \sin\left(\frac{2\pi F_M t}{F_s}\right)\right)$$

$$r(t) = \sum_{i=1}^{N} A\sin\left(\frac{2\pi f_i t}{F_s} + \theta_i - \pi f_i \Delta t \sin\left(\frac{2\pi F_M t}{F_s}\right)\right),$$

respectively, where A corresponds to an amplitude, $f_i$ corresponds to carrier frequencies, $F_M$ corresponds to a modulation frequency, $F_s$ corresponds to a sampling rate, respectively, $\Delta t$ corresponds to a maximum interaural time difference, and $\theta_i$ corresponds to arbitrary phases, and t corresponds to a discrete time index. Alternatively, the left and right stereo channels may have the form:

$$l(t) = \sum_{i=1}^{N} A\sin\left(\frac{2\pi f_i t}{F_s} + \theta_i + \pi \Delta t \sin\left(\frac{2\pi F_M t}{F_s}\right)\right)$$

-continued $$r(t) = \sum_{i=1}^{N} A\sin\left(\frac{2\pi f_i t}{F_s} + \theta_i - \pi \Delta t \sin\left(\frac{2\pi F_M t}{F_s}\right)\right).$$

respectively, where A corresponds to an amplitude, $f_i$ corresponds to carrier frequencies, $F_M$ corresponds to a modulation frequency, $F_s$ corresponds to a sampling rate, respectively, $\Delta t$ corresponds to a maximum interaural time difference, and $\theta_i$ corresponds to arbitrary phases, and t corresponds to a discrete time index.

The audible signals are detected and transduced to electrical signals by a binaural detector 315. In system 300, the binaural detector 315 includes a dummy head 320 having a first microphone 325 disposed on the left side of the dummy head 320 and to a second microphone 330 disposed on the right side of the dummy head 320. Microphones 325 and 330 may be disposed in ear molds that filter the audible signals to simulate the outer ear response of a human being. Additionally, or in the alternative, the outer ear response may be simulated using a head related transfer function 335.

The signal corresponding to the left outer ear response is provided to a first bandpass filter bank 340 and the signal corresponding to the right outer ear response is provided to a second bandpass filter bank 345. The bandpass filter banks 340 and 345 may simulate the physiological response of the middle ear of a human being. The output of each bandpass filter of the bandpass filter banks 340 and 345 is provided to a respective half-wave rectifier 350 and 355. The half-wave rectified signals are provided to respective low pass filters 360 and 365. The half-wave rectification and subsequent low pass filtering of each sub-band signal provided from bandpass filter banks 340 and 345 may simulate the physiological response of the inner ear of a human being.

The low pass filtered sub-band signals are provided to a signal processor/analyzer 370. The signal processor/analyzer 370 may determine binaural activity of two or more sub-bands of the detected binaural signal as filtered by the bandpass filter banks 340 and 345. The binaural activity may be determined for some or all sub-bands of the bandpass filter banks 340 and 345. The signal processor/analyzer 370 may determine the interaural time differences and the interaural level differences of the sub-bands and combine them to obtain the binaural activity over time and lateral deviation for each of the sub-bands. The binaural activity of the sub-bands may be smoothed in time using a floating rectangular integration window. The window may have a duration of about 10-200 milliseconds.

The binaural activity in at least two of the sub-bands may be used by the signal processor/analyzer 370 to determine the objective listener envelopment of the loudspeakers-room environment. The objective listener envelopment may be determined by executing a correlation analysis of the phase relationship of binaural activities in the sub-bands. A monaural signal may be provided at line 375 to supplement the binaural activity detection and provide an estimate of the objective listener envelopment by the signal processor/analyzer 370. A single objective listener envelopment value may be determined by weighting objective listener envelopment values using a frequency-band weighting curve.

Figure 4:
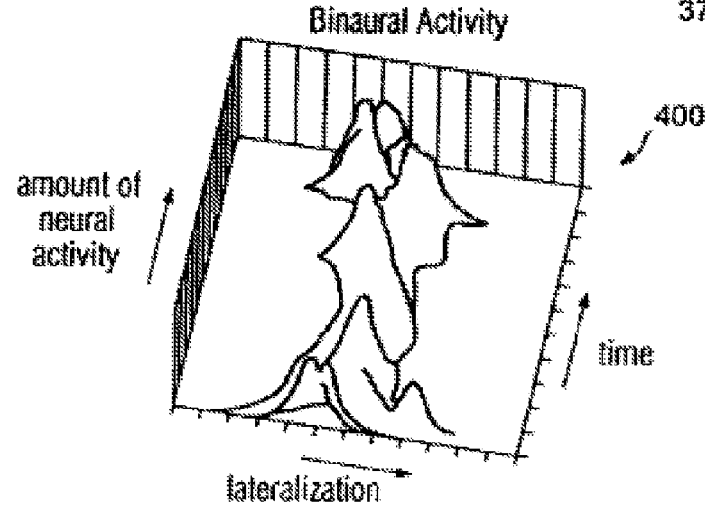
FIG. 4 is a three-dimensional graph of exemplary binaural activity in sub-bands of a detected binaural signal over time that may occur using the systems shown in FIG. 1 through FIG. 3.

FIG. 4 is a three-dimensional graph 400 of binaural activity in sub-bands of a detected binaural signal over time that may occur using the systems shown in FIG. 1 through FIG. 3. The binaural activity in each of the sub-bands varies with time and corresponds to the interaural time difference and/or interaural level difference of the noise signals.

Figure 5:
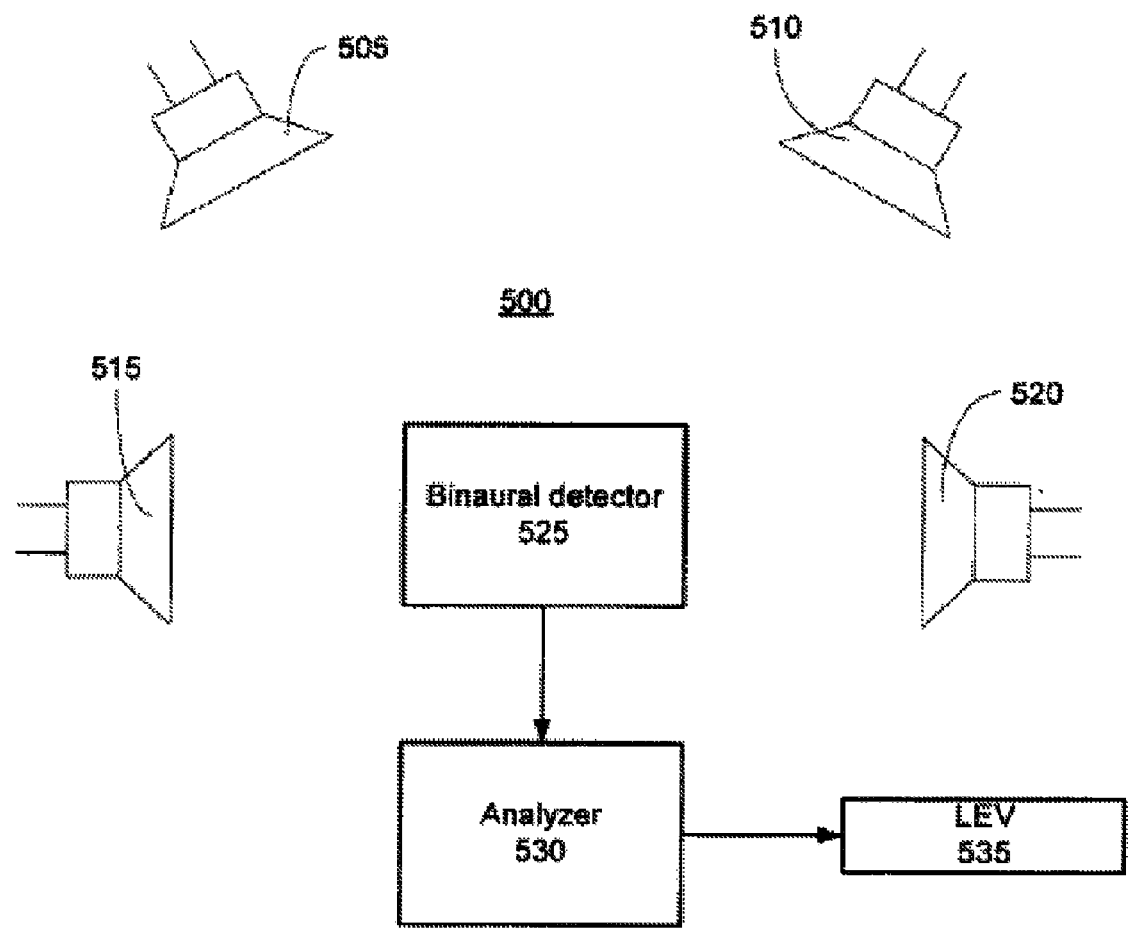
FIG. 5 is a system employing multiple pairs of loudspeakers that may be used to determine listener envelopment of a loudspeakers-room environment.

FIG. 5 is a system 500 employing multiple pairs of loudspeakers that may be used to determine listener envelopment of a loudspeakers-room environment. System 500 includes a first pair of loudspeakers 505 and 510, and a second pair of loudspeakers 510 and 520. Loudspeaker 505 provides a first audible frequency modulated noise signal and loudspeaker 510 provides a second audible frequency modulated noise signal during a first time interval to determine a first averaged listener envelopment value for the loudspeakers-room environment. Loudspeaker 515 provides the first audible frequency modulated noise signal and loudspeaker 520 provides the second audible frequency modulated noise signal during a second time interval to determine a second averaged listener envelopment value for the loudspeakers-room environment.

The averaged envelopment values are determined through cooperation of the binaural detector 525 and analyzer 530. The first averaged listener envelopment value and the second averaged listener envelopment value are weighted by the analyzer 530 depending on the positions of the loudspeakers in the loudspeakers-room environment to obtain a single weighted overall objective listener envelopment value 535.

The first and second audible frequency modulated noise signals may be broadband noise signals having sinusoidally varying interaural time differences and may correspond to left and right stereo channels of the form:

$$l(t) = \sum_{i=1}^{N} A\sin\left(\frac{2\pi f_i t}{F_s} + \theta_i + \pi f_i \Delta t \sin\left(\frac{2\pi F_M t}{F_s}\right)\right)$$

$$r(t) = \sum_{i=1}^{N} A\sin\left(\frac{2\pi f_i t}{F_s} + \theta_i - \pi f_i \Delta t \sin\left(\frac{2\pi F_M t}{F_s}\right)\right),$$

respectively, where A corresponds to an amplitude, $f_i$ corresponds to carrier frequencies, $F_M$ corresponds to a modulation frequency, $F_s$ corresponds to a sampling rate, respectively, $\Delta t$ corresponds to a maximum interaural time difference, and $\theta_i$ corresponds to arbitrary phases, and t corresponds to a discrete time index. Alternatively, the left and right stereo channels may have the form:

$$l(t) = \sum_{i=1}^{N} A\sin\left(\frac{2\pi f_i t}{F_s} + \theta_i + \pi \Delta t \sin\left(\frac{2\pi F_M t}{F_s}\right)\right)$$

$$r(t) = \sum_{i=1}^{N} A\sin\left(\frac{2\pi f_i t}{F_s} + \theta_i - \pi \Delta t \sin\left(\frac{2\pi F_M t}{F_s}\right)\right).$$

respectively, where A corresponds to an amplitude, $f_i$ corresponds to carrier frequencies, $F_M$ corresponds to a modulation frequency, $F_s$ corresponds to a sampling rate, respectively, $\Delta t$ corresponds to a maximum interaural time difference, and $\theta_i$ corresponds to arbitrary phases, and t corresponds to a discrete time index.

Figure 6:
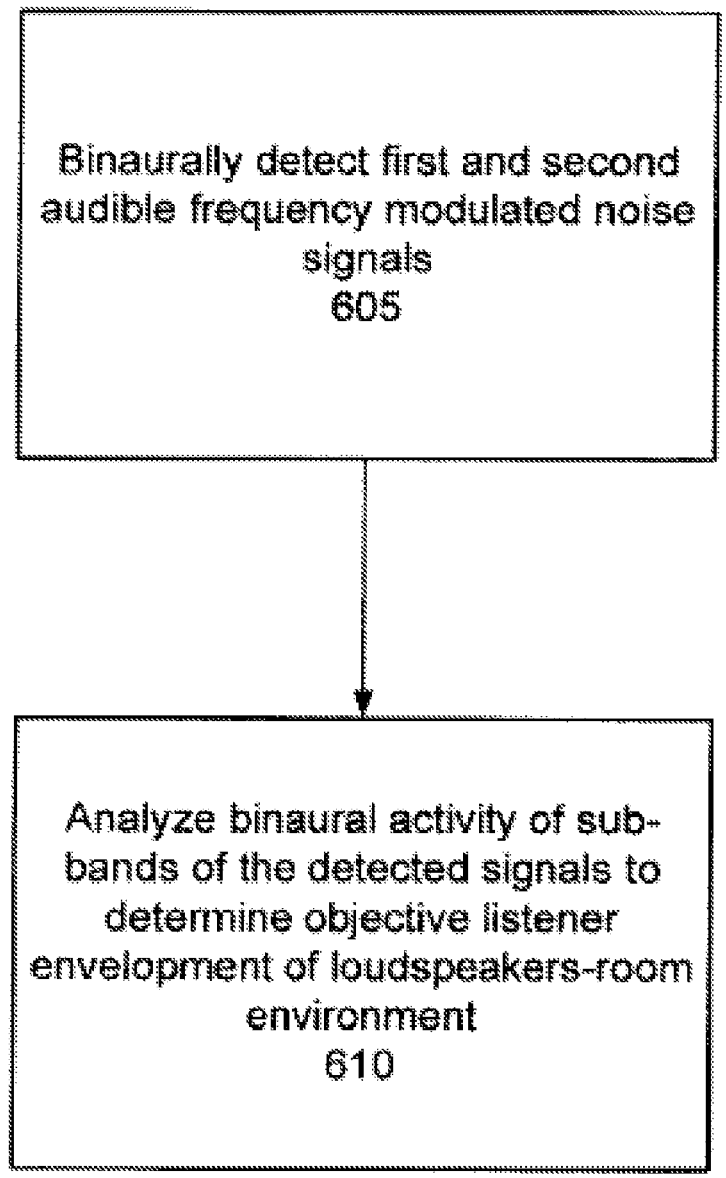
FIG. 6 is a process that may determine listener envelopment of a loudspeakers-room environment.

FIG. 6 shows a process that may determine listener envelopment of a loudspeakers-room environment. At 605, the process binaurally detects first and second audible frequency modulated noise signals. The binaural activities in the sub-bands of the detected signals are determined at 610. The binaural activities are used to determine objective listener envelopment of the loudspeakers-room environment.

Figure 7:
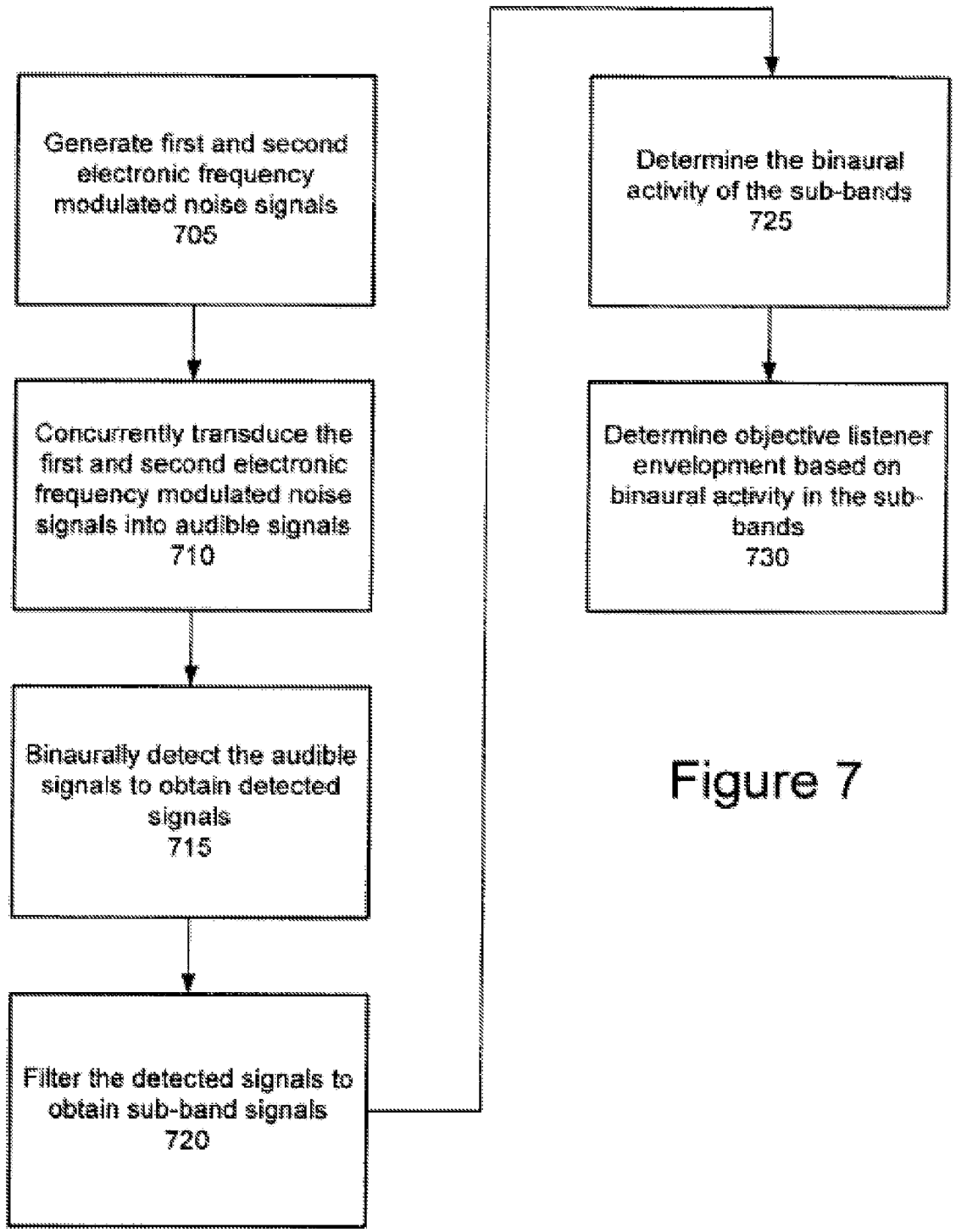
FIG. 7 is a second process that may determine listener envelopment of a loudspeakers-room environment.

FIG. 7 shows a second process that may determine listener envelopment of a loudspeakers-room environment. At 705, the process generates first and second electronic frequency modulated noise signals. The first and second electronic frequency modulated noise signals are concurrently transduced into audible signals at 710. At 715 the binaural signals are audibly detected to obtain detected signals. The detected signals are filtered at 720 to obtain sub-band signals. The filtering at 720 may correspond to the physiological response of a human ear to the noise signals. At 725, the process determines the binaural activity of the sub-bands. The objective listener envelopment of the loudspeakers-room environment is determined based on the binaural activity in the sub-bands at 730.

Figure 8:
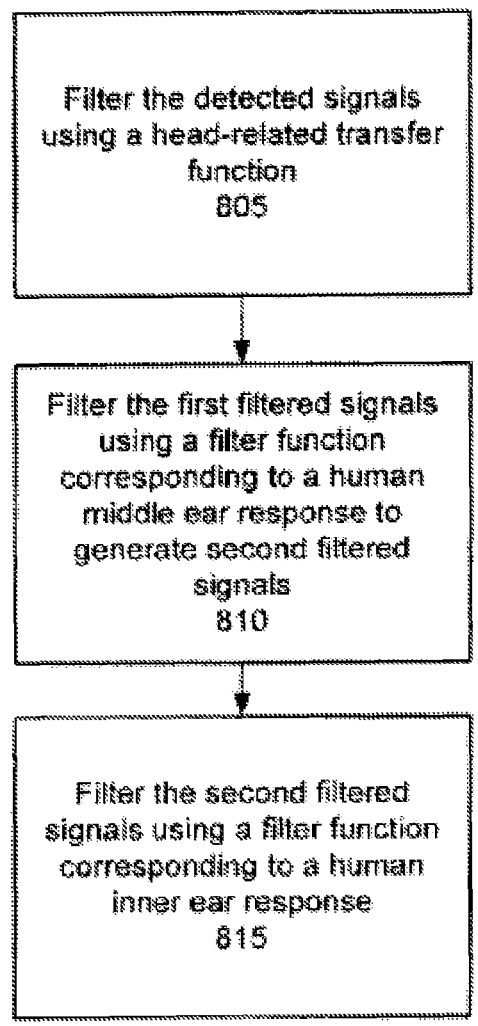
FIG. 8 is a process that may implement the filtering operations shown in FIG. 7.

FIG. 8 is a process that may implement the filtering operations at 720 of FIG. 7. The process filters the detected signals using a head-related transfer function at 805. The first filtered signals are filtered using a filter function corresponding to a human middle ear response to generate second filtered signals at 810. The second filtered signals are filtered at 815 using a filter function corresponding to a human inner ear response.

Figure 9:
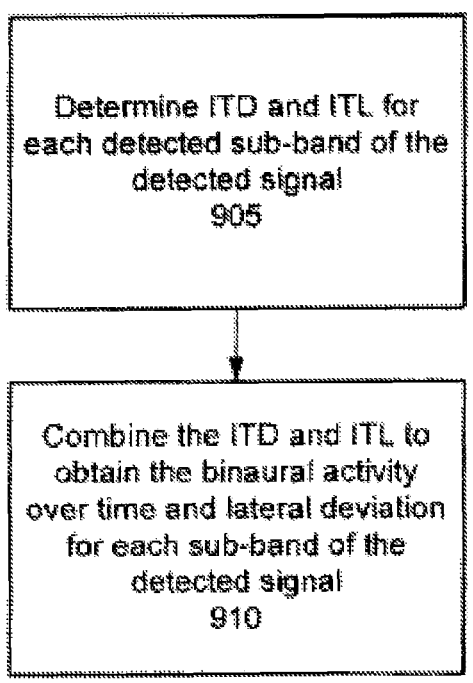
FIG. 9 is a process that may determine the binaural activity of the sub-bands as shown in FIG. 7.

FIG. 9 is a process that may determine the binaural activity of the sub-bands at 725 in FIG. 7. At 905, the process may determine the interaural time difference and interaural level difference for each detected subject-band of the detected signal. The interaural time differences and the interaural level differences are combined at 910 to obtain the binaural activity over time and lateral deviation for each sub-band of the detected signal.

Figure 10:
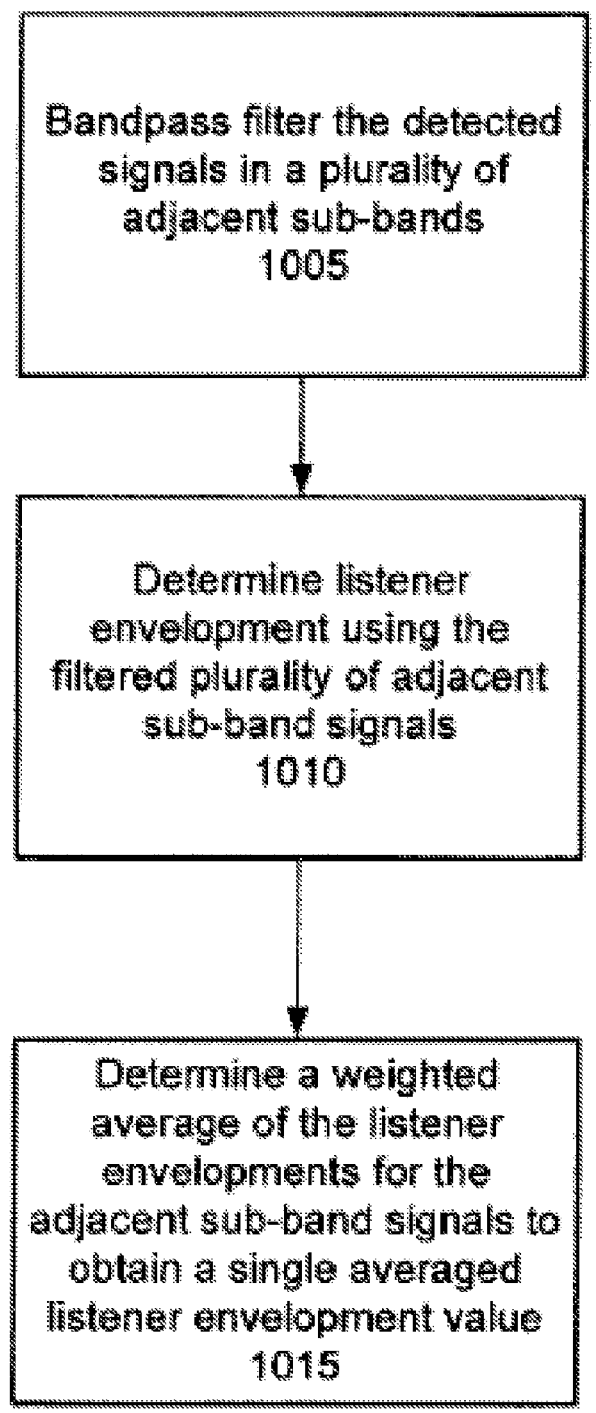
FIG. 10 is a process that may obtain a single averaged listener envelopment value.

FIG. 10 shows a process that may be used to obtain a single averaged listener envelopment value. At 1005, the binaurally detected signals are being passed filtered to generate signals in a plurality of adjacent sub-bands. The listener envelopments for each of the adjacent sub-bands signals are determined at 1010. At 1015, the process determines a weighted average of listener envelopments for the adjacent sub-band signals to obtain a single averaged listener envelopment value. The weighting values may be based on the frequency of the sub-band signals used to determine listener envelopment values.

Figure 11:
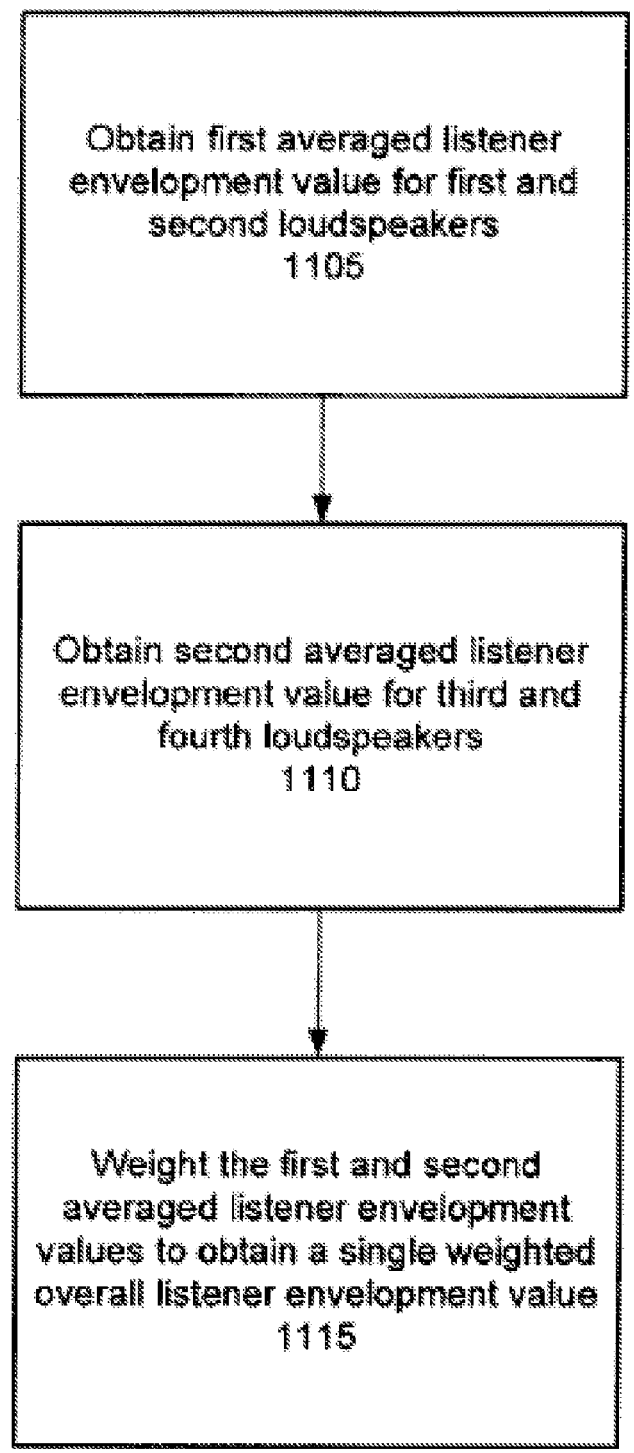
FIG. 11 it is a process may obtain a single averaged listener envelopment value in a system having multiple loudspeaker pairs.

FIG. 11 shows a process that may obtain a single averaged listener envelopment value in a system having multiple loudspeaker pairs. At 1105, the process obtains a first averaged listener envelopment value for first and second loudspeakers. The process obtains a second averaged listener envelopment value for the third and fourth loudspeakers at 1110. At 1115, the first and second averaged listener envelopment values are weighted to obtain a single weighted overall listener envelopment value. The weighting of the first and second averaged listener envelopment values may be based on the positions of the loudspeakers within the loudspeakers-room environment.

The systems and processes may further comprise cutting of the binaural activity at the edges using a cutting function with an adaptive threshold. The listener envelopment of the generated noise signals in this case may be determined based on the cut binaural activity. Cutting the edges may be used to avoid side-lobes. The higher the binaural activity density, the more side-lobes may occur. And adaptive threshold depending on the activity density may be used to suppress side-lobes. Single auditory events below the adaptive threshold may be cut to weight lateral deviation of binaural activity. a The systems and processes may be implemented in hardware, software, or a combination of hardware and software. The noise signals may be generated using hardware, software executing noise generation algorithms, hardware and/or software using noise generation tables, and/or other noise signal generation mechanisms. Filtering operations may be implemented using hardware filters, software filters, or a combination of hardware and software filters. Detection of the binaural activity may be implemented using hardware and/or software, or a combination of both. Analysis of the binaural activity may be implemented using hardware, software, or a combination of both.

While various embodiments of the invention have been described, it will be apparent to those of ordinary skill in the art that many more embodiments and implementations are possible within the scope of the invention. Accordingly, the invention is not to be restricted except in light of the attached claims and their equivalents.

I claim:

1. A method for estimating listener envelopment of a loudspeakers-room environment comprising:
   binaurally detecting via a binaural detector, first and second audible frequency modulated noise signals that are received in a concurrent manner from first and second loudspeakers, respectively, in the loudspeakers-room environment to generate detected signals;
   generating the detected signals via the binaural detector in response to the first and second audible frequency modulated noise signals;
   analyzing binaural activity of at least two sub-bands of the detected signals to determine objective listener envelopment of the loudspeakers-room environment;
   applying a cutting function with an adaptive threshold to edges of the binaural activity, where the objective listener envelopment is determined based on the cut binaural activity;
   selecting the adaptive threshold to edges of the binaural activity to suppress side lobes based on a density of the binaural activity; and
   weighting values of the determined objective listener envelopment using a frequency-band weighting curve to obtain a single value for the determined objective listener envelopment,
   where the binaurally detected first and second audible frequency modulated noise signals comprise broadband noise having sinusoidally varying interaural time differences.

2. The method of claim 1, where further comprising smoothing the binaural activity of the at least two sub-bands in time using a floating rectangular integration window.

3. The method of claim 1 wherein the binaural activity corresponds to a measure of binaural neural activity.

4. A method for estimating listener envelopment of a loudspeakers-room environment comprising:
   generating first and second electronic frequency modulated noise signals;
   concurrently transducing the first and second electronic frequency modulated noise signals using first and second loudspeakers, respectively, to generate audible signals in a room environment containing the first and second loudspeakers;
   binaurally detecting, via a binaural detector, the audible signals;
   generating detected signals via the binaural detector in response to the audible signals;
   filtering the detected signals to obtain sub-band signals for at least two sub-bands of the detected signals;
   determining binaural activity of the at least two sub-bands of the detected signals;

determining objective listener envelopment of the loudspeakers-room environment based on the binaural activity of the at least two sub-bands of the detected signals;

applying a cutting function with an adaptive threshold to edges of the binaural activity, where the objective listener envelopment is determined based on the cut binaural activity selecting the adaptive threshold to edges of the binaural activity to suppress side lobes based on a density of the binaural activity; and weighting values of the determined objective listener envelopment using a frequency-band weighting curve to obtain a single value for the determined objective listener envelopment, where binaurally detecting the audible signals to obtain the detected signals comprise binaurally detecting first and second audible frequency modulated noise signals that comprise broadband noise having sinusoidally varying interaural time differences.

5. The method of claim 4, where filtering the detected signals comprises:
filtering the detected signals using a head-related transfer function to obtain first filtered signals; and
filtering the first filtered signals using a filter function corresponding to a human middle ear response.

6. The method of claim 4, where determining the binaural activity comprises:
determining interaural time differences and interaural level differences for each of the at least two sub-bands of the detected signals; and
combining the interaural time differences and the interaural level differences to obtain the binaural activity over time and lateral deviation for each of the at least two sub-bands of the detected signals.

7. The method of claim 4, further comprising smoothing of the binaural activity in time using a floating rectangular integration window.

8. The method of claim 4, further comprising determining a weighted average of the listener envelopments of adjacent sub-band signals for which binaural activities are determined to obtain a single averaged listener envelopment value.

9. The method of claim 4, further comprising:
transducing the first electronic frequency modulated signal using a third loudspeaker; and
transducing the second electronic frequency modulated signal using a fourth loudspeaker.

10. The method of claim 9, further comprising:
obtaining a first averaged listener envelopment value for the first and second loudspeakers;
obtaining a second averaged listener envelopment value for the third and fourth loudspeakers; and
weighting the first and second averaged listener envelopment values depending on positions of the loudspeakers in the room environment to obtain a single weighted overall listener envelopment value.

11. The method of claim 4 wherein the binaural activity corresponds to a measure of binaural neural activity.

12. A method comprising:
binaurally detecting via a binaural detector, first and second audible frequency modulated noise signals that are received in a concurrent manner from first and second loudspeakers, respectively, in a loudspeakers-room environment to generate detected signals;
generating the detected signals via the binaural detector in response to the first and second audible frequency modulated noise signals;
analyzing binaural activity of at least two sub-bands of the detected signals to determine objective listener envelopment of a loudspeakers-room environment;
applying a cutting function with an adaptive threshold to edges of the binaural activity, where the objective listener envelopment is determined based on the cut binaural activity;
selecting the adaptive threshold to edges of the binaural activity to suppress side lobes based on a density of the binaural activity; and
weighting values of the determined objective listener envelopment using a frequency-band weighting curve to obtain a single value for the determined objective listener envelopment,
where the binaurally detected first and second audible frequency modulated noise signals comprise broadband noise having sinusoidally varying interaural time differences.

13. The method of claim 12 wherein the binaural activity corresponds to a measure of binaural neural activity.

* * * * *